United States Patent
Hess et al.

(10) Patent No.: US 10,560,513 B2
(45) Date of Patent: *Feb. 11, 2020

(54) SMALL DISK SUPPORT FOR LARGE CLOUD-BASED STORAGE SYSTEMS

(71) Applicant: Apple Inc., Cupertino, CA (US)

(72) Inventors: Michael Pirnack Hess, Campbell, CA (US); Jean-Gabriel Morard, Chaville (FR); Pierre d'Herbemont, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,557

(22) Filed: Dec. 21, 2018

(65) Prior Publication Data

US 2019/0260820 A1 Aug. 22, 2019

Related U.S. Application Data

(63) Continuation of application No. 14/869,885, filed on Sep. 29, 2015, now Pat. No. 10,165,040.

(60) Provisional application No. 62/171,977, filed on Jun. 5, 2015.

(51) Int. Cl.
*H04L 29/08* (2006.01)
*G06F 16/16* (2019.01)
*G06F 3/06* (2006.01)

(52) U.S. Cl.
CPC .............. *H04L 67/06* (2013.01); *G06F 3/06* (2013.01); *G06F 3/067* (2013.01); *G06F 3/0608* (2013.01); *G06F 3/0652* (2013.01); *G06F 16/162* (2019.01); *H04L 67/1097* (2013.01)

(58) Field of Classification Search
CPC ........................... H04L 67/1097; H04L 67/06
See application file for complete search history.

(56) References Cited

U.S. PATENT DOCUMENTS

| | | | |
|---|---|---|---|
| 6,418,456 B1 | 7/2002 | Mastie et al. | |
| 8,903,959 B2 | 12/2014 | Kaiser et al. | |
| 8,938,638 B2 | 1/2015 | Taranov et al. | |
| 2013/0305039 A1 | 11/2013 | Gauda | |
| 2014/0156793 A1 | 6/2014 | Chan et al. | |
| 2014/0282844 A1 | 9/2014 | Devetter et al. | |
| 2016/0063009 A1* | 3/2016 | Charania | G06F 16/162 707/693 |
| 2016/0094649 A1 | 3/2016 | Dornquast et al. | |
| 2016/0171530 A1* | 6/2016 | Sa | G06Q 30/0251 705/14.49 |
| 2016/0359949 A1 | 12/2016 | Hess et al. | |

* cited by examiner

*Primary Examiner* — El Hadji M Sall
(74) *Attorney, Agent, or Firm* — Dickinson Wright RLLP (57) ABSTRACT

Disclosed herein is a technique for managing storage space in a user device by efficiently downloading files from a cloud-based storage system and evicting files from the user device. According to some embodiments, files are continuously downloaded in a download mode until a particular threshold is satisfied. When the threshold is satisfied, the files can be downloaded in an on-demand mode as needed by the user, where the user device operates in the on-demand mode until a sufficient amount of storage space is freed by evicting files from the user device. Thereafter, the user device can switch back to the download mode.

20 Claims, 4 Drawing Sheets

SMALL DISK SUPPORT FOR LARGE CLOUD-BASED STORAGE SYSTEMS

CROSS-REFERENCE TO RELATED APPLICATION

The present application is a continuation of U.S. application Ser. No. 14/869,885, entitled "SMALL DISK SUPPORT FOR LARGE CLOUD-BASED STORAGE SYSTEMS" filed Sep. 29, 2015, set to issue as U.S. Pat. No. 10,165,040 on Dec. 25, 2018, which claims the benefit of U.S. Provisional Application No. 62/171,977, entitled "SMALL DISK SUPPORT FOR LARGE CLOUD-BASED STORAGE SYSTEMS" filed Jun. 5, 2015, the contents of which are incorporated herein by reference in their entirety for all purposes.

FIELD

The described embodiments set forth a technique for managing storage space in a user device based on retrieval and eviction of files associated with the user device.

BACKGROUND

Cloud-based storage systems and services (e.g., iCloud drive by Apple®) are becoming prevalent as a means for managing data across various user devices, and can provide users with large amounts of storage space (e.g., 1 TB) to store their data. Generally, user devices tend to have less storage space (e.g., 128 GB) than the amount of storage space offered by the cloud-based storage systems. Typically, users are involved in a process of identifying desired files that need to be kept on a storage device (e.g., a Solid State Drive (SSD)) of the user device. In some cases, there may not be enough storage space remaining in the user device for all the desired files and/or to download additional files, which can degrade the user's overall satisfaction with the process. Consequently, there is a need for an improved system for balancing storage space usage between the user device and the cloud-based storage system.

SUMMARY

Representative embodiments set forth herein disclose various techniques for managing storage space in a user device by efficiently retrieving/downloading files from a cloud-based storage system and evicting files from the user device. Files from the cloud-based storage system are downloaded until a threshold is satisfied in terms of free storage space on the user device. When the threshold is satisfied, the files are downloaded on-demand as needed by the user. In order to make additional storage space available for a particular file that needs to be downloaded from the cloud-based storage system, files stored on the user device can be selectively evicted from the user device. In particular, files that have not been used by the user for a particular period of time are evicted from the user device in order to make storage space available for the particular file. The retrieval and eviction of files is carried out in a manner that is transparent to the user thereby providing an enhanced user experience.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for selectively evicting files from a user device in order to make storage space available for a particular file stored in a cloud-based storage system. According to one embodiment, files most recently added/edited on the cloud-based storage system are downloaded to the user device prior to downloading other less recent files, while files that have not been used by the user for a particular period of time are evicted from the user device to free up storage space. In this manner, the user is seamlessly provided with a working set of files that includes most recent files accessed/edited by the user at the user device, remotely on the cloud-based storage system, or both.

Accordingly, the techniques described herein provide a mechanism for managing storage space in the user device by efficiently downloading files from the cloud-based storage system and evicting files from the user device. A more detailed discussion of these techniques is set forth below and described in conjunction with FIGS. 1-4, which illustrate detailed diagrams of systems and methods that can be used to implement these techniques.

Figure 1:
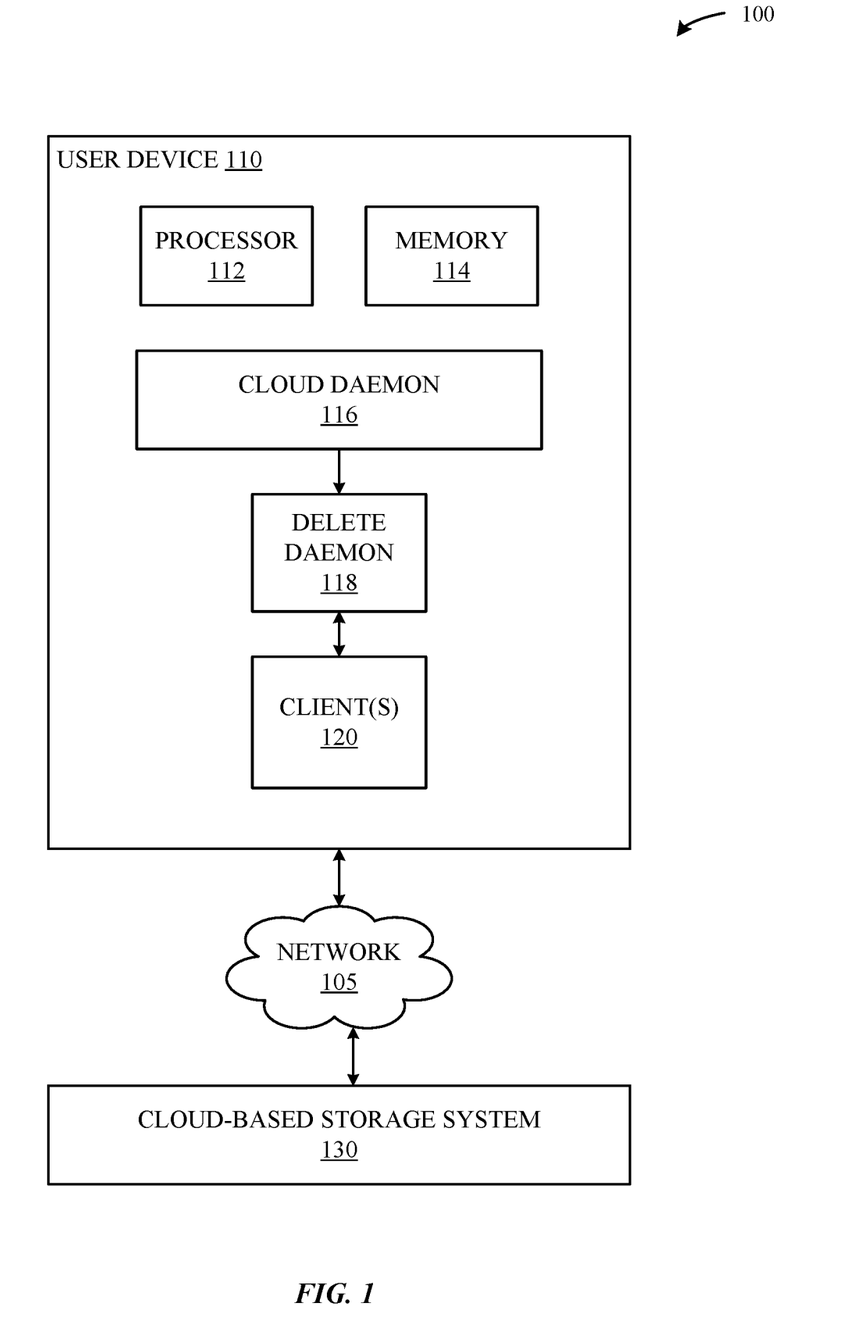
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a device having lesser file storage capacity than a cloud-based storage system 130 such as a computing device (e.g., MacBook Pro, MacBook, or other any other computing device by Apple®). A processor 112, in conjunction with the memory 114, can implement an operating system (OS) (e.g., OS X by Apple®) that is configured to execute various applications (e.g., native OS applications and user applications), daemons, and other processes/services on the user device 110. The user device 110 can communicate with the cloud-based storage system 130 via a network 105. The network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

As shown in FIG. 1, the user device 110 can include a cloud daemon 116, a delete daemon 118, and a number of clients 120. The cloud daemon 116 represents a process that interacts with the cloud-based storage system 130 (e.g., iCloud drive by Apple®) for purposes of retrieving/downloading files from the cloud-based storage system 130 to the user device 110 or storing/uploading files from the user device 110 to the cloud-based storage system 130. The cloud-based storage system 130 provides a user of the user device 110 with large amounts of storage space (e.g., much larger than the storage space on a hard drive of the user device 110) in a remote location that is securely accessible (e.g., using a password) via the user device 110. The cloud-based storage system 130 enables all user's data to be synchronized among multiple user devices 110 associated with the user (i.e., all devices that have a same user account (e.g., iCloud™ account) configured).

As shown in FIG. 1, the delete daemon 118 represents a process that interacts with the client(s) 120 for purposes of evicting files from the user device 110. The client(s) 120 can represent native or resident applications that are installed on the user device 110 and the user directly interacts with. According to one embodiment, some of the client(s) 120 can represent daemons that run as a background process rather than under direct control of the user of the user device 110. Each client 120 has data (e.g., files or other data) associated therewith that consume a particular amount of storage space on the user device 110.

According to one embodiment, the cloud daemon 116 communicates a request for a particular amount of storage space to the delete daemon 118. In turn, the delete daemon 118 generates a number of requests for the number of clients 120 to free up the requested amount of storage space by evicting one or more files associated with the client(s) 120.

Figure 2:
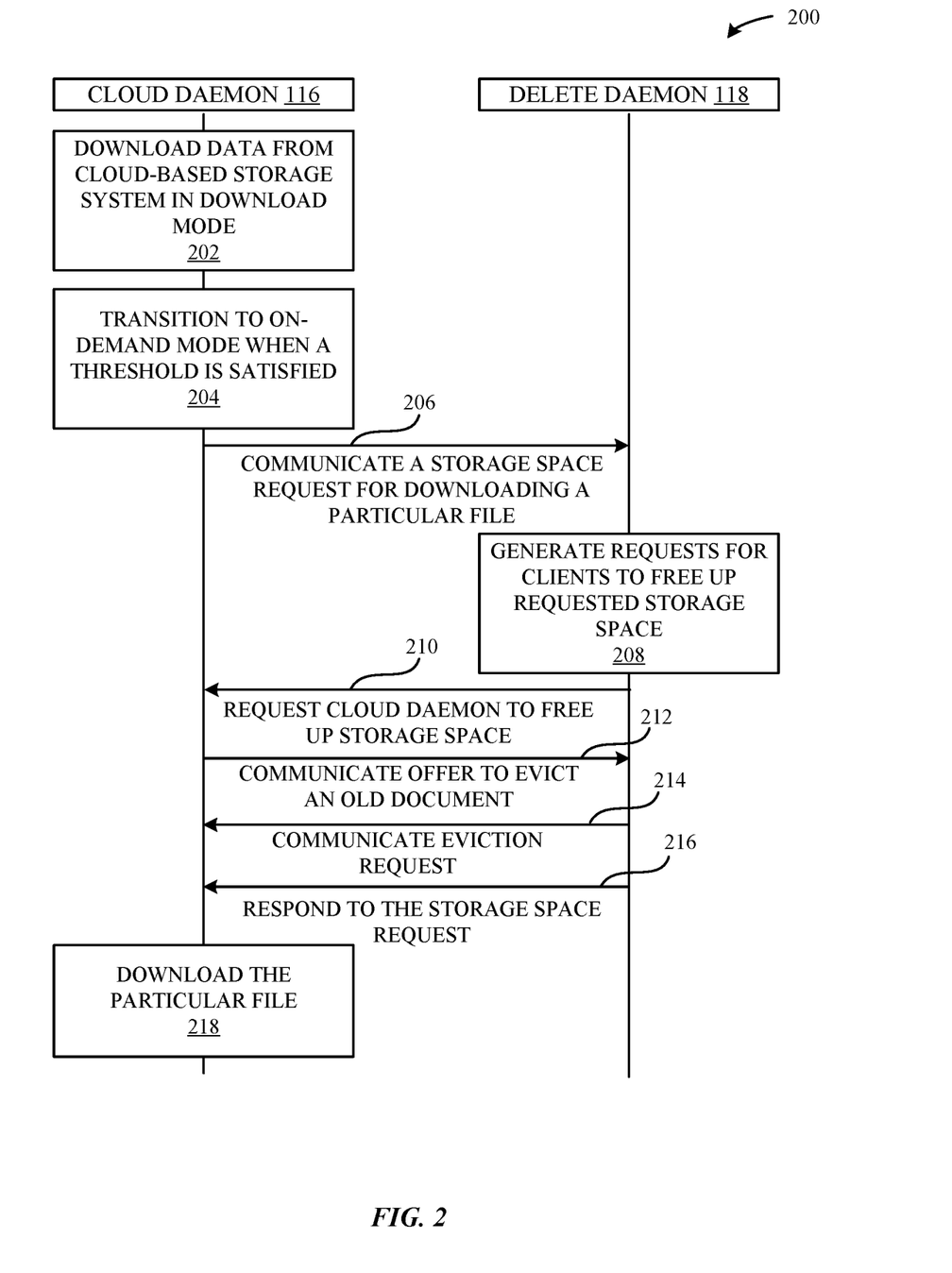
FIG. 2 illustrates a sequence diagram of a method for managing storage space in a user device of FIG. 1, according to some embodiments.

FIG. 2 illustrates a sequence diagram of a method 200 for managing storage space that is performed by various components of the user device 110, according to some embodiments. As shown in FIG. 2, at step 202, the cloud daemon 116 downloads data (e.g., files or other data) from the cloud-based storage system 130 in a download mode. In the download mode, any files available on the cloud-based storage system 130 are continuously downloaded to the user device 110. According to one embodiment, when the cloud-based storage system 130 includes data that is less than a threshold amount (e.g., 5 GB), the data is downloaded to the user device 110.

According to some embodiments, the most recent files on the cloud-based storage system 130 are scheduled to be downloaded to the user device 110 prior to other less recent files. According to some other embodiments, all files associated with a particular client 120 (e.g., a client that has been recently launched) are downloaded to the user device 110 prior to downloading the files associated with another client 120 that has not been launched.

At step 204, the cloud daemon 116 transitions from the download mode to an on-demand mode. In particular, when the cloud-based storage system 130 includes data that is greater than the threshold amount, the cloud daemon 116 transitions to the on-demand mode where the files are downloaded on-demand and as needed by the user. According to some embodiments, when a particular threshold pertaining to free storage space on the user device 110 is satisfied (referred to hereinafter as "free space threshold"), the cloud daemon 116 discontinues the downloading of the data and transitions to the on-demand mode. The free space threshold can include a minimum amount of free storage space that needs to be available in the user device when the transition occurs. For example, if the cloud-based storage system 130 includes 20 GB of data, the user device 110 has 15 GB of storage space, and the free space threshold is 3 GB, the cloud daemon 116 downloads 12 GB of data from the cloud-based storage system 130 while leaving 3 GB of free space on the user device 110. In this scenario, the cloud daemon 116—1) does not download the remaining 8 GB of data from the cloud-based storage system 130, 2) does not download any new files that become available at the cloud-based storage system 130, and 3) transitions from the download mode to the on-demand mode.

According to some embodiments, in the on-demand mode, only metadata associated with the files is downloaded to the user device 110 while the actual content of the files is downloaded on-demand. For example, the user device 110 includes enough metadata for an application (e.g., client 120) to know that a particular file associated with the application exists on the cloud-based storage system 130 and to download the file as needed by the user.

According to some embodiments, in some cases, a particular file can be downloaded from the cloud-based storage system 130 even though the free space threshold is satisfied in the on-demand mode. The particular file can include a new file, a new version of an existing file on the user device 110, or an old file that was previously evicted from the user device 110. For example, the particular file can be downloaded when the user requests or initiates the download of the particular file and/or when an edit to the particular file whose previous version is already on the user device 110 is available at the cloud-based storage system 130. In these cases, the download of the particular file/edits to the particular file can cause the 3 GB of free storage space to be consumed and/or the user device 110 to run out of free storage space.

At step 206, the cloud daemon 116 communicates, to the delete daemon 118, a request for storage space (referred to hereinafter as "storage space request") for downloading the particular file (e.g., when the particular file requires more than 3 GB of storage space). The storage space request can include the amount of storage space required for the particular file.

The delete daemon 118, at step 208, generates a number of requests for the number of clients 120 to free up/reclaim the requested storage space. According to one embodiment, the delete daemon 118 determines the amount of storage space that needs to be freed based on the storage space request. For example, if the particular file requires 5 GB of storage space and the user device has 3 GB of free storage space, the delete daemon 118 determines that 2 GB of storage space needs to be freed/reclaimed.

According to some embodiments, the delete daemon 118 queries each of the client(s) 120 for an amount of storage space that the client 120 can reclaim (e.g., by deleting/evicting data a portion of its data/files). In turn, each client 120 responds with an offer of the amount of storage space it can reclaim at a number of urgency levels. For example, each client 120 can respond with a first amount of storage space it can reclaim at a first urgency level, a second amount of storage space it can reclaim at a second urgency level, and a third amount of storage space it can reclaim at a third urgency level. Each urgency level places a higher demand on the client 120 to free up storage space. For example, the first amount of storage space can include the least amount of storage space that the client 120 can reclaim with zero feature loss for the user. The second amount of storage space can include a greater amount of storage space (greater than the first amount of storage space) that the client 120 can reclaim but any data that is deleted to reclaim the storage space would need to be re-downloaded if the user desires access to the data. The third amount of storage space can include the highest amount of storage space (greater than both the first and second amounts of the storage space) that the client 120 can reclaim but deletion of the data would cause the client 120 to be unusable for a particular period of time.

According to some embodiments, the cloud daemon 116 can also serve as the client 120 for the delete daemon 118, where the delete daemon queries each of the client(s) 120 (including the cloud daemon 116) for an amount of storage space that client 120 can reclaim. In other words, the delete daemon 118 can also request the cloud daemon 116 to free up storage space, at step 210. In response to the request, the cloud daemon 116 generates an offer to evict older document(s) to free up storage space. At step 212, the cloud daemon 116 communicates the offer to the delete daemon 118. The delete daemon 118 considers the offer provided by the cloud daemon 116 as well as other offers provided by the other clients 120. The delete daemon 118 can determine whether the cloud daemon 116 should be asked to reclaim storage space (based on the offers). In response to a determination that the cloud daemon 116 should be asked to reclaim storage space, the delete daemon 118 communicates an eviction request to the cloud daemon 116, at step 214. The cloud daemon 116 can, in turn, evict the older document(s) to make storage space available for the particular file to be downloaded. The cloud daemon 116 can notify the delete daemon 118 of the amount of storage space that has been reclaimed by the cloud daemon 116. In turn, at step 216, the delete daemon 118 responds to the storage space request from the cloud daemon 116 indicating that sufficient storage space to download the particular file is available at the user device 110. The cloud daemon 116, at step 218, downloads the particular file from the cloud-based storage system 130. According to some embodiments, in response to a determination that the cloud daemon 116 should not be asked to reclaim storage space, the delete daemon 118 can request one or more other clients 120 to reclaim storage space.

According to some embodiments, based on the responses from the client(s) 120, the delete daemon 118 generates a list of clients 120 that can be requested to evict a portion of their files. For example, the list can include clients 120 that have not been accessed/launched for a particular period of time (e.g., 1-2 weeks) and each client 120 in the list of clients 120 can be requested to reclaim a particular amount of storage space based on a particular urgency level. The delete daemon 118 communicates eviction requests to each client 120 in the list of clients 120. The eviction request for each client 120 can identify the particular amount of storage space the client is requested to reclaim at the particular urgency level. Each client 120, in turn, evicts the portion of its files to free up the particular amount of storage space. According to one embodiment, the list can include clients 120 sorted in the order of least recently accessed (e.g., not been accessed for the longest period of time) to most recently accessed. The least recently accessed client 120 is requested to reclaim the particular amount of storage space first followed by the other clients in order to ensure that the oldest files get evicted from the user device 110 to make storage space available for the particular file that needs to be downloaded from the cloud-based storage system 130. According to one embodiment, evicting a file involves deleting the file from the user device 110, uploading the evicted file to the cloud-based storage system 130, and leaving only the metadata of the file (also referred to as a "fault") on the user device 110.

According to some embodiments, each client 120 responds to the corresponding eviction request notifying (the delete daemon 118) the amount of storage space the client 120 reclaimed. Based on the responses from the client(s) 120, the delete daemon 118 responds to the storage space request from the cloud daemon 116, at step 216. In particular, when the requested amount of storage space for the particular file is freed (e.g., 2 GB in the example provided above), the delete daemon 118 responds to the storage space request notifying the cloud daemon 116 that sufficient storage space to download the particular file from the cloud-based storage system 130 is now available. At step 218, based on the response from the delete daemon 118, the cloud daemon 116 downloads the particular file from the cloud-based storage system 130. According to one embodiment, the downloading of the particular file to the user device 110 involves downloading of a new file along with the associated metadata, downloading of a new version of an existing file, or downloading of an old file whose metadata already exists on the user device 110 (e.g., an old file that was previously evicted but is now requested by the user).

According to some embodiments, the delete daemon 118 can trigger the client(s) 120 to delete the cached data associated with the client(s) 120 prior to evicting the files. The cached data includes data that can be deleted without posing a significant risk to the functioning of the user device 110.

According to some embodiments, the downloading of data from the cloud-based storage system 130 and the evicting of data from the user device 110 is carried out automatically and in a manner that is transparent to the user such that the user always has access to a working set of files that includes most recent files accessed/edited by the user at the user device 110, remotely on the cloud-based storage system 130, or both. According to one embodiment, the cloud daemon 116 can selectively download the files from the cloud-based storage system 130 and the client(s) 120 can selectively evict the files from the user device 110 in order to ensure that the user always has the most recent and most important set of files without having to manage the files on his/her own.

According to some embodiments, the transition from the download mode to the on-demand mode occurs when the free space threshold is satisfied and the user device 110/cloud daemon 116 operates in the on-demand mode until a sufficient amount of storage space is freed by evicting files from the user device 110. According to one embodiment, the cloud daemon 116 determines whether an event has occurred (indicated by the delete daemon, for example) indicating that a large amount of storage space has been freed. When the event is detected, the user device 110/cloud daemon 116 switches back to the download mode from the on-demand mode. According to one embodiment, the user device 110/cloud daemon 116 is prevented from oscillating between the two modes to avoid performance issues.

According to some embodiments, the downloading of files and/or uploading of evicted files by the cloud daemon 116 is integrated with the file coordination process in the OS. The file coordination process acts as a locking mechanism for the files that are downloaded from and/or uploaded to the cloud-based storage system 130. A particular file can be associated with an application (e.g., client 120) executing on the user device 110 and the file coordination process coordinates the reads and writes performed on the particular file by the application and the cloud daemon 116. The file coordination process prevents file contention between the application and the cloud daemon 116. According to one embodiment, when the user tries to read the particular file for which only metadata exists on the user device 110 (i.e., only a fault exists), the file coordination process can notify the cloud daemon 116 that the particular file needs to be downloaded. When the cloud daemon 116 is in the on-demand mode, the cloud daemon 116 can accordingly communicate the storage space request associated with the particular file. According to one embodiment, this integration ensures that the set of files that are on the user device 110 and/or the cloud-based storage system 130 are the most recent and important set of files for the user.

Figure 3:
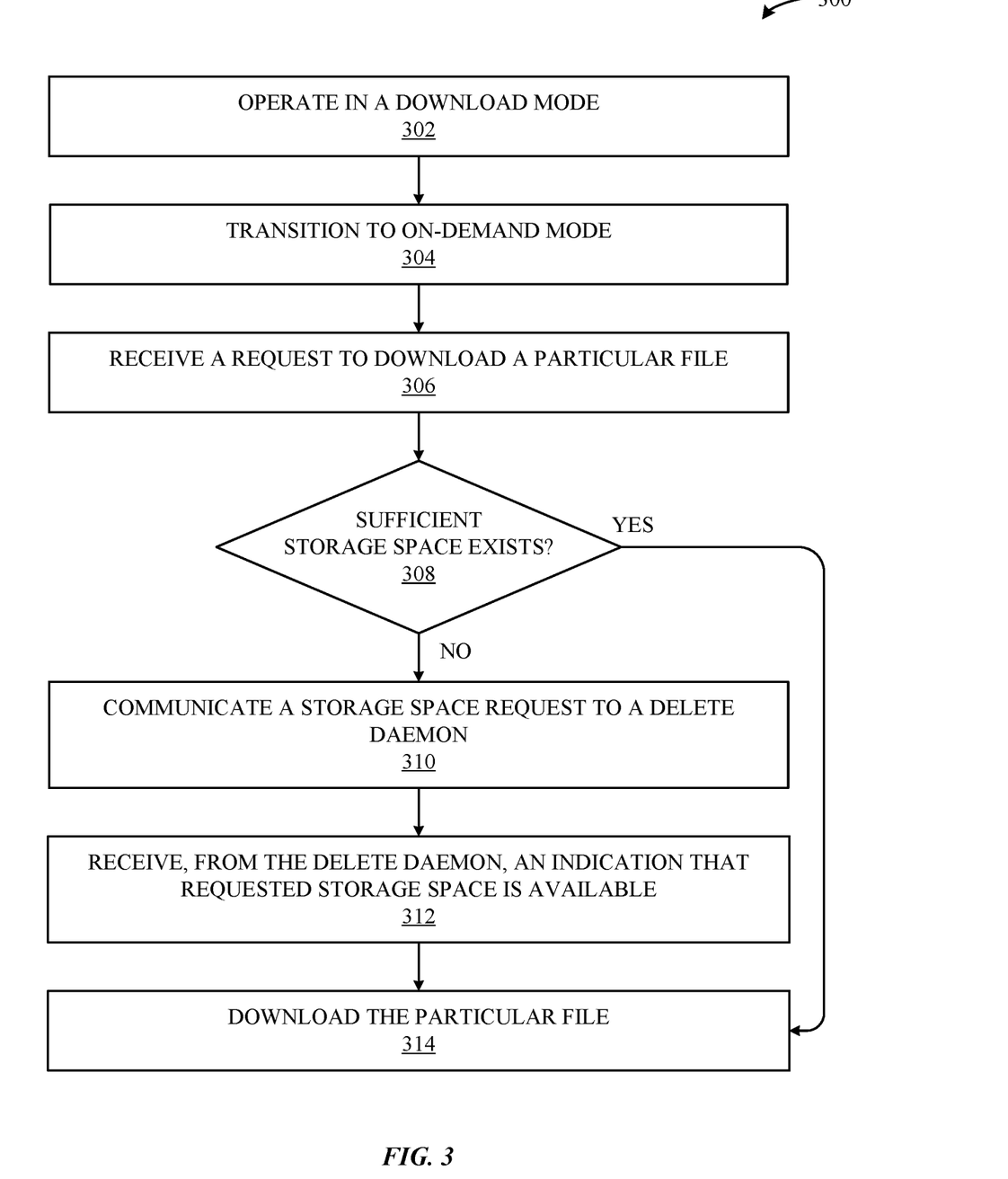
FIG. 3 illustrates a method that is carried out by a cloud daemon implemented by the user device of FIG. 1, according to one embodiment.

FIG. 3 illustrates a method 300 that is carried out by the cloud daemon 116 implemented by the user device 110 of FIG. 1, according to one embodiment. As shown, the method 300 begins at step 302, where the cloud daemon 116 operates in the download mode. In the download mode, the cloud daemon 116 keeps downloading files from the cloud-based storage system 130 until the free space threshold is satisfied. At step 304, the cloud daemon 116 transitions from the download mode to the on-demand mode when the free space threshold is satisfied. At step 306, the cloud daemon 116 receives a request to download a particular file from the cloud-based storage system 130. The request can include a user-initiated request.

At step 308, the cloud daemon 116 determines whether sufficient storage space exists for the particular file in the user device 110. For example, if the particular file requires 5 GB of storage space but the free space threshold indicates that only 3 GB of free storage space is available, a determination is made that sufficient storage space does not exist for the particular file. When a determination is made that sufficient storage space exists for the particular file, the file is downloaded from the cloud-based storage system 130 to the user device 110, at step 314.

When a determination is made that sufficient storage space does not exist for the particular file, the cloud daemon 116 communicates the storage space request to the delete daemon 118, at step 310. In response to the storage space request, the delete daemon 118 interacts with the client(s) 120 to make storage space available for the particular file (e.g., by evicting old files from the user device 110). According to some embodiments, the cloud daemon 116 serves as a client 120 for the delete daemon 118, where the delete daemon 118 can also request the cloud daemon 116 to free up storage space. In turn, the cloud daemon 116 can evict old files to make space available for the particular file.

At step 312, the cloud daemon 116 receives an indication that the requested storage space is available. For example, the cloud daemon 116 can receive a response from the delete daemon 118 when the requested storage space is available on the user device 110. At step 314, the cloud daemon 116 downloads the particular file from the cloud-based storage system 130.

While various embodiments have been described for user devices having lesser file storage capacity than cloud-based storage systems, it will be appreciated that the embodiments described herein are not so limited and can be used for other types of computing devices having higher file storage capacity.

While various embodiments described herein discuss interaction between the cloud daemon 116 and the delete daemon 118 for purposes of managing storage space in the user device 110, it will be understood that the disclosure is not so limited. According to some embodiments, the cloud daemon 116 can manage the downloading/eviction of files to/from the user device 110 (e.g., when additional storage space is needed) without interacting with or requiring the implementation of the delete daemon 118.

Figure 4:
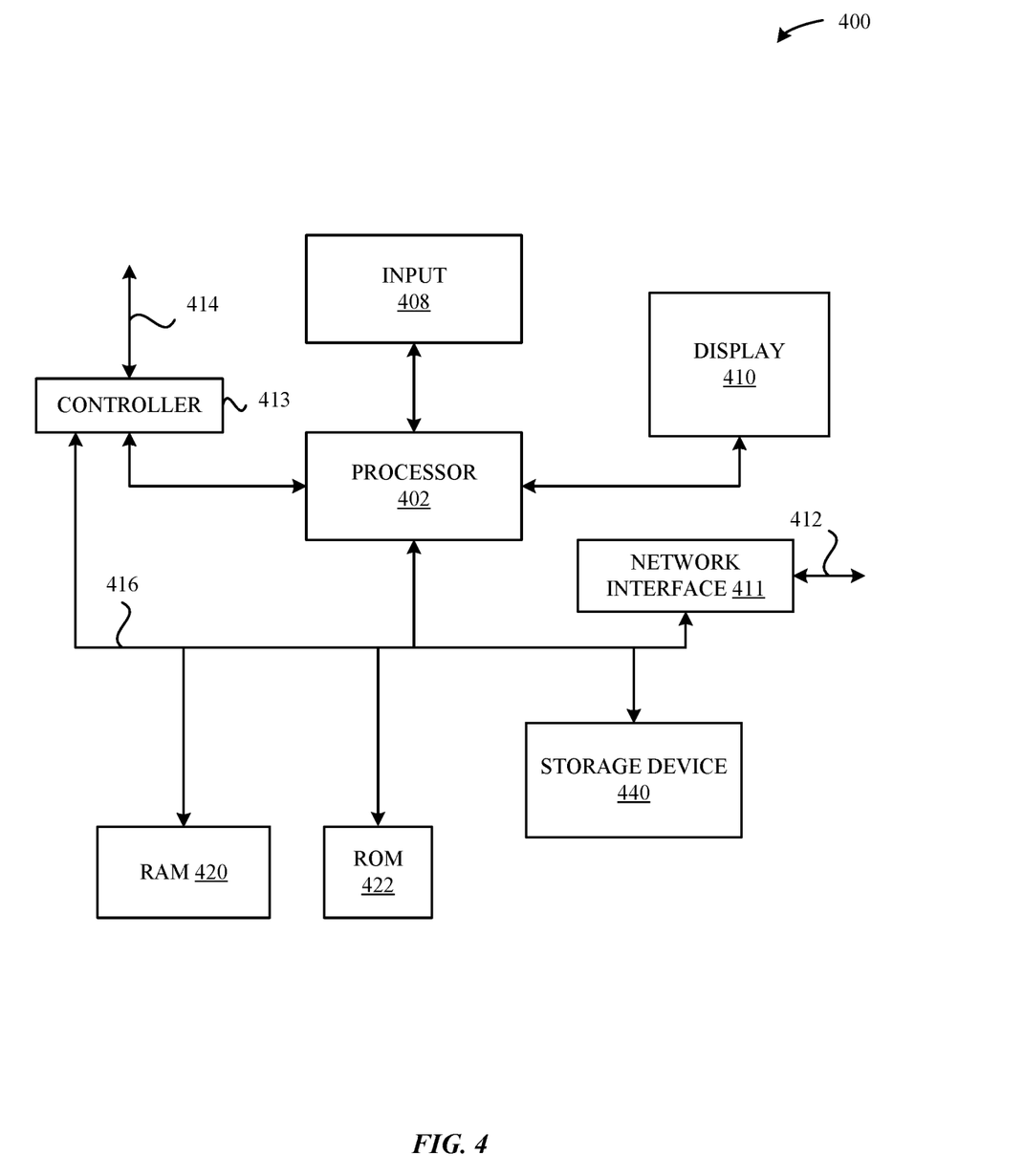
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the user device 110 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user (for example, email interface described herein). A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a nonvolatile manner. The RAM 420 can provide volatile data storage, and stores instructions related to the operation of the computing device 400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing storage space in a user device, the method comprising, at the user device:
in response to detecting that available storage space on the user device satisfies a threshold:
transitioning into a download mode that causes the user device to download files from a cloud-based storage and store the files on the user device; and
in response to detecting that the available storage space on the user device no longer satisfies the threshold:
transitioning from the download mode into an on-demand mode that causes the user device to, in response to receiving a first request to download a file of a size that exceeds the available storage space:
issue, to at least one application, a second request to evict at least one file associated with the at least one application to establish, at least in part, an amount of available storage space required to store the file on the user device, and
receive, from the at least one application, an indication of the amount of available storage space the at least one application was able to establish on the user device, and
in response to determining, based on the indication received from the at least one application, that at least the amount of available storage space was established:
download the file from the cloud-based storage and store the file on the user device.

2. The method of claim 1, wherein, when the user device is in the download mode, the files are downloaded from the cloud-based storage in a prioritized order based on recent access dates associated with the files.

3. The method of claim 1, further comprising, in conjunction with transitioning from the download mode to the on-demand mode:
downloading metadata for files stored on the cloud-based storage that were not downloaded to the user device while in the download mode.

4. The method of claim 1, wherein the file is not stored on the user device when the first request is received.

5. The method of claim 1, wherein the at least one application is selected among at least one other application based on a last-accessed or last-launched date associated with the at least one application.

6. The method of claim 1, wherein evicting the at least one file from the user device comprises:
deleting the at least one file from the user device while retaining metadata associated with the at least one file on the user device.

7. The method of claim 6, wherein the metadata indicates that the at least one file is not locally available on the user device, but is remotely available via the cloud-based storage.

8. The method of claim 1, wherein downloading the file from the cloud-based storage comprises downloading a new file and metadata associated with the new file from the cloud-based storage.

9. At least one non-transitory computer readable storage medium configured to store instructions that, when executed by at least one processor included in a user device, cause the user device to manage storage space in the user device, by carrying out steps that include:
in response to detecting that available storage space on the user device satisfies a threshold:
transitioning into a download mode that causes the user device to download files from a cloud-based storage and store the files on the user device; and
in response to detecting that the available storage space on the user device no longer satisfies the threshold:
transitioning from the download mode into an on-demand mode that causes the user device to, in response to receiving a first request to download a file of a size that exceeds the available storage space:
issue, to at least one application, a second request to evict at least one file associated with the at least one application to establish, at least in part, an amount of available storage space required to store the file on the user device, and
receive, from the at least one application, an indication of the amount of available storage space the at least one application was able to establish on the user device, and
in response to determining, based on the indication received from the at least one application, that at least the amount of available storage space was established:
download the file from the cloud-based storage and store the file on the user device.

10. The at least one non-transitory computer readable storage medium of claim 9, wherein, when the user device is in the download mode, the files are downloaded from the cloud-based storage in a prioritized order based on recent access dates associated with the files.

11. The at least one non-transitory computer readable storage medium of claim 9, wherein the steps further include, in conjunction with transitioning from the download mode to the on-demand mode:
downloading metadata for files stored on the cloud-based storage that were not downloaded to the user device while in the download mode.

12. The at least one non-transitory computer readable storage medium of claim 9, wherein the at least one application is selected among at least one other application based on a last-accessed or last-launched date associated with the at least one application.

13. The at least one non-transitory computer readable storage medium of claim 9, wherein evicting the at least one file from the user device comprises:
deleting the at least one file from the user device while retaining metadata associated with the at least one file on the user device.

14. The at least one non-transitory computer readable storage medium of claim 13, wherein the metadata indicates that the at least one file is not locally available on the user device, but is remotely available via the cloud-based storage.

15. A user device configured to managing storage space, the user device comprising:
at least one processor; and
at least one memory storing instructions that, when executed by the at least one processor, cause the user device to:
in response to detecting that available storage space on the user device satisfies a threshold:
transition into a download mode that causes the user device to download files from a cloud-based storage and store the files on the user device; and
in response to detecting that the available storage space on the user device no longer satisfies the threshold:
transition from the download mode into an on-demand mode that causes the user device to, in response to receiving a first request to download a file of a size that exceeds the available storage space:
issue, to at least one application, a second request to evict at least one file associated with the at least one application to establish, at least in part, an amount of available storage space required to store the file on the user device, and
receive, from the at least one application, an indication of the amount of available storage space the at least one application was able to establish on the user device, and
in response to determining, based on the indication received from the at least one application, that at least the amount of available storage space was established:
download the file from the cloud-based storage and store the file on the user device.

16. The user device of claim 15, wherein, when the user device is in the download mode, the files are downloaded from the cloud-based storage in a prioritized order based on recent access dates associated with the files.

17. The user device of claim 15, wherein the at least one processor further causes the user device to, in conjunction with transitioning from the download mode to the on-demand mode:
download metadata for files stored on the cloud-based storage that were not downloaded to the user device while in the download mode.

18. The user device of claim 15, wherein the at least one application is selected among at least one other application based on a last-accessed or last-launched date associated with the at least one application.

19. The user device of claim 15, wherein evicting the at least one file from the user device comprises:
deleting the at least one file from the user device while retaining metadata associated with the at least one file on the user device.

20. The user device of claim 19, wherein the metadata indicates that the at least one file is not locally available on the user device, but is remotely available via the cloud-based storage.

* * * * *